June 10, 1958 J. H. BESSER 2,838,319
FOLDABLE PRODUCE-GATHERING VEHICLE
Filed June 4, 1956 2 Sheets-Sheet 1
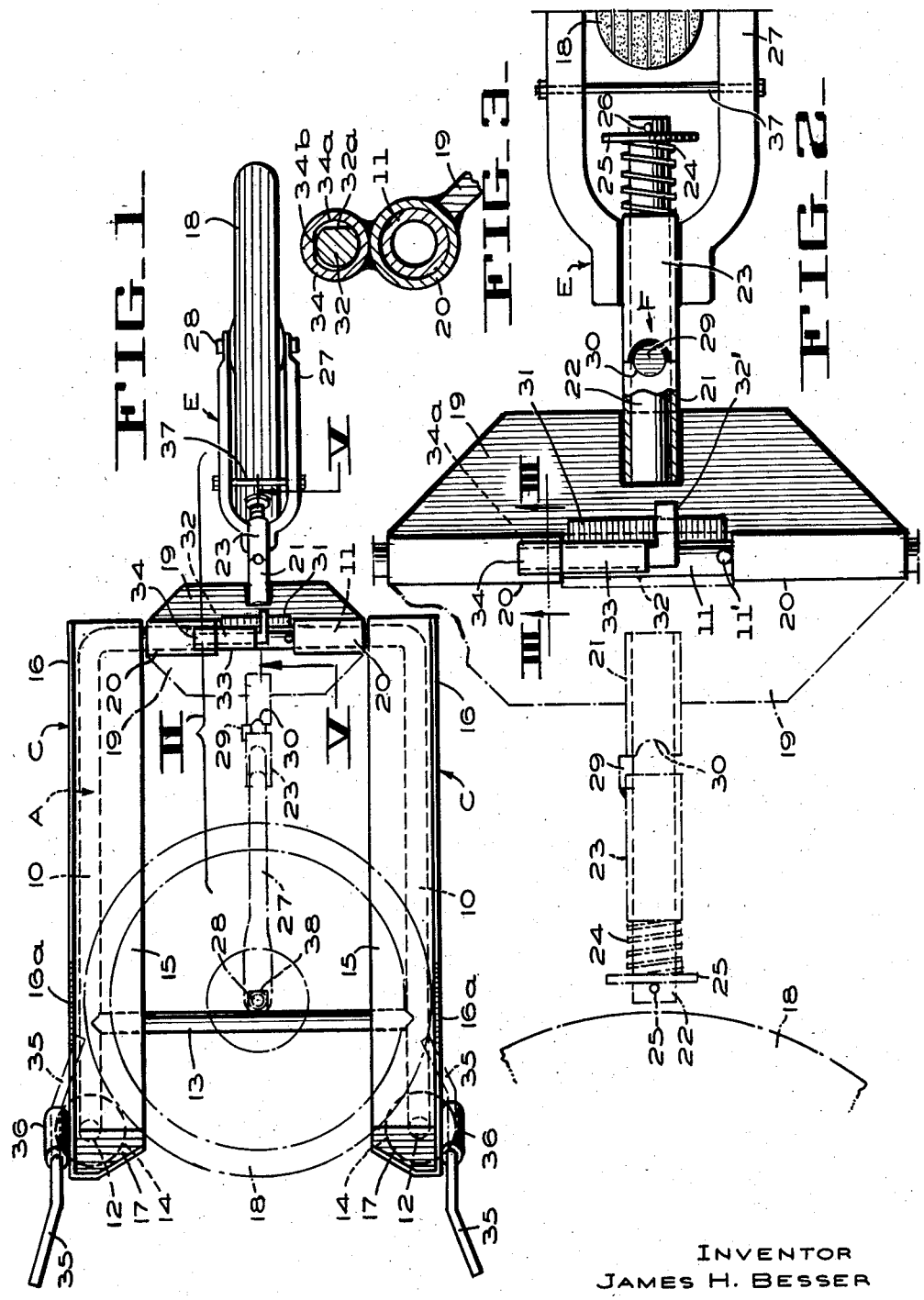
INVENTOR
JAMES H. BESSER
BY Munn & Liddy
ATTORNEYS June 10, 1958  J. H. BESSER  2,838,319
FOLDABLE PRODUCE-GATHERING VEHICLE
Filed June 4, 1956  2 Sheets-Sheet 2
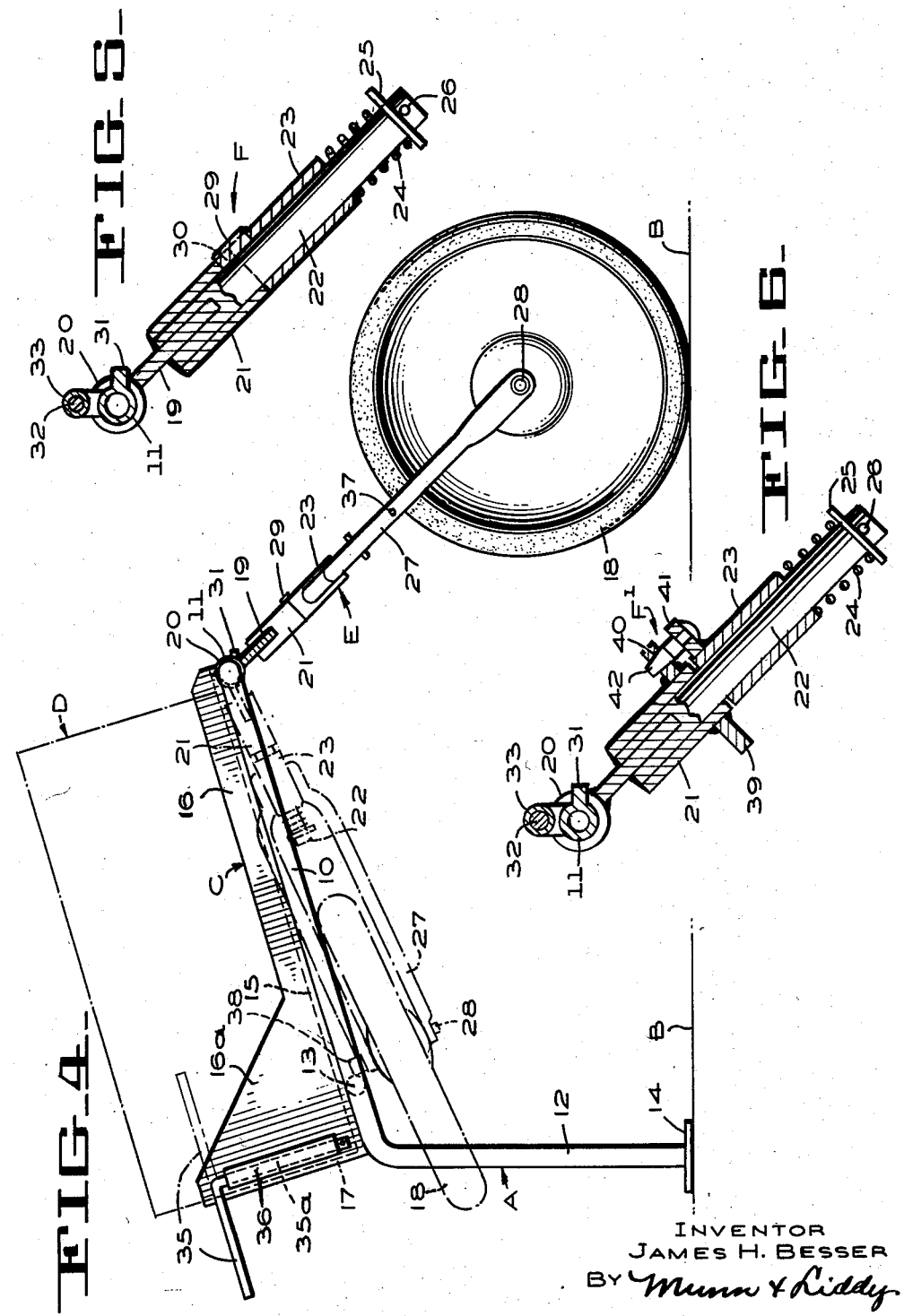
INVENTOR
JAMES H. BESSER
BY Munn & Liddy
ATTORNEYS

United States Patent Office 2,838,319
Patented June 10, 1958

2,838,319

FOLDABLE PRODUCE-GATHERING VEHICLE

James H. Besser, San Juan Bautista, Calif.

Application June 4, 1956, Serial No. 589,283

3 Claims. (Cl. 280—41)

An object of my invention is to provide a foldable produce-gathering vehicle, which may be readily wheeled from place to place, while being used in the field for gathering produce, such as lettuce. The vehicle may be conveniently folded into a rather compact unit for transportation and storage purposes. The invention consists of the combinations, constructions and arrangement of parts, as hereinafter described and claimed.

It is further proposed to provide a foldable produce-gathering vehicle which is simple in construction, durable and efficient for the purpose intended.

Other objects and advantages will appear as the specification continues. The novel features of the invention will be set forth in the claims hereunto appended.

Drawings

For a better understanding of the invention, reference should be had to the accompanying drawings, forming part of this application, in which:

Figure 1 is a top plan view of my foldable produce-gathering vehicle, the full lines disclosing the wheel as being disposed in a load-carrying position, while the dot-dash lines illustrate the wheel in its folded position;

Figure 2 is an enlargement of that portion of Figure 1 inclosed within the bracket II;

Figure 3 is an enlarged sectional view taken along the line III—III of Figure 2;

Figure 4 is a side elevational view of Figure 1;

Figure 5 is an enlarged sectional view taken along the line V—V of Figure 1; and Figure 6 is a view similar to Figure 5, but disclosing a modified fork-latching means for holding the wheel in a vertical plane, when disposed in a load-carrying position.

While I have shown only the preferred forms of my invention, it should be understood that various changes, or modifications, may be made within the scope of the annexed claims without departing from the spirit thereof.

Detailed description

In carrying my invention into practice, I provide a supporting frame indicated generally at A. This frame includes a pair of spaced-apart longitudinally-extending side members 10, which are interconnected at their forward ends by a transverse member 11. These side members have trailing ends provided with depending legs 12, the latter having feet 14 which are adapted for resting on the ground B. In actual practice, the frame A may be fashioned from a single piece of tubing or rod. A transverse brace 13 has been provided between the rear portions of the side members to reinforce the frame.

As disclosed in Figures 1 and 4, a pair of angle-shaped platforms C are secured to the tops of the side members 10 of the frame. These platforms have bottom flanges 15 projecting toward each other to constitute supports for a carton D (or other crate) placed thereon (see Figure 4). These platforms have upwardly-extending flanges 16, which are adapted to bear against opposite sides of the carton to limit lateral shifting of the latter.

When the feet 14 rest on the ground, the side members 10 slope rearwardly from the transverse member 11. Accordingly, the platforms C are fashioned with upwardly-projecting flanges 17 at their trailing ends, which are positioned to abut the carton D to limit rearward movement of the latter relative to the platforms. The carton is supported at the proper height so that the produce, such as lettuce, may be packed directly therein.

It will be noted that a wheel-mounting structure E is swingably attached to the transverse member 11 of the supporting frame, and has a wheel 18 journalled thereon. This structure is swingable from a forwardly and downwardly-extending load-carrying position, wherein the wheel 18 rests on the ground B (see full lines in Figures 1 and 4), into a rearwardly-extending folded position, wherein the wheel underlies the platform C (see dot-dash lines).

The wheel-mounting structure E includes a swingable plate 19 having tubes 20 fixed thereto, which are journalled on the transverse member 11. With particular reference to Figures 2 and 5, it will be seen that an upper sleeve 21 is fixed to the plate 19. Moreover, a shaft 22 is anchored to this plate and extends downwardly through and below the upper sleeve. A lower sleeve 23 is mounted below the upper sleeve 21 for rotation on the shaft, and a spring 24 is provided for yieldingly urging the lower sleeve toward the upper sleeve. As shown in the drawings, this spring encircles the shaft 22 and is interposed between the lower sleeve 23 and a washer 25, the latter being held on the shaft by a pin 26.

Referring now to Figures 1, 2 and 4, it will be apparent that a bifurcated fork 27 is secured to the lower sleeve 23, and this fork carries an axle 28 on which the wheel 18 is journalled. When the wheel-mounting structure E is swung into a load-carrying position, as shown by the full lines in Figure 4, the wheel 18 rests on the ground B and it is held in a vertical plane by a projection 29 that is welded to the lower sleeve 23, which projection enters a recess 30 fashioned in the bottom rim of the upper sleeve 21. The spring 24 yieldingly urges the lower sleeve toward the upper sleeve; and, therefore, when the projection 29 is aligned with the recess 30, the former will snap into the latter. The projection 29 and the recess 30 constitute a fork-latching means indicated generally at F.

When the wheel occupies its load-carrying position, the plate 19 abuts a stop lug 31, which is fixed to the transverse member 11. This lug limits forward swinging of the plate 19.

For holding the wheel 18 in load-carrying position, a latch bolt 32 has been provided. This bolt is carried by a bearing 33, which is fixed to the transverse member 11. When the wheel is extended into the full-line position shown in Figure 4, the bolt 32 may be inserted into the bore 34a of a tubular keeper 34, the latter being welded or otherwise secured to one of the tubes 20 (see Figure 3).

As shown in Figure 3, the bolt 32 has a flat surface 32a at its forward side portion, while the bore 34a of the keeper 34 is fashioned with a flat surface 34b at its top. When the surfaces 32a and 34b are arranged parallel with one another, the bolt 32 may be readily inserted into or retracted from the keeper 34. However, when the bolt is turned into the position show in Figure 3, it will bind against the flat surface 34b, thus frictionally holding the bolt engaged with the keeper.

In order to operate the bolt 32, it has been provided with a handle 32' (see Figure 2). When the bolt is retracted from the tubular keeper 34, a stop pin 11' on the transverse member 11 prevents the bolt from dropping out of the bearing 33.

At any time when the operator desires to fold the wheel, the fork 27 may be pulled outwardly until the projection 29 is withdrawn from the recess 30. This movement will compress the spring 24, and then the operator may turn the fork and its wheel through an angle of 90°. Upon retracting the bolt 32 from the keeper 34, the entire wheel-mounting structure E may be swung about the transverse member 11, as a pivot, so as to bring the wheel 18 into a folded position, wherein the wheel underlies the platforms C (see dot-dash lines in Figures 1 and 4).

As clearly shown in Figures 1 and 4, the axle 28 is provided with a nut 38 thereon, which is adapted to frictionally engage with the transverse brace 13 to thus retain the wheel 18 in folded position, when the wheel is moved rearwardly.

For the purpose of moving the vehicle over the ground, a pair of handles 35 have been provided. These handles have legs 35a, which are rotatably disposed in tubular brackets 36, the latter being fastened to the back portions of the platforms C (see Figures 1 and 4). As suggested by dot-dash lines, these handles may be folded forwardly so as to abut the enlarged portions 16a of the side flanges 16 on the platforms C.

When the handles 35 are grasped and raised, during forward movement of the vehicle, the platforms C will be disposed in approximately horizontal positions, at which time the feet 14 will clear the ground.

In order to remove mud from the wheel 18, a scraper 37 has been provided. This scraper may be formed by a bolt, which is secured to the fork 27 so as to be positioned adjacent to the periphery of the wheel.

Referring now to Figure 6, I have shown a modified form of a fork-latching means, which is designated by the reference character F¹. In this case, the upper sleeve 21 has a washer-like element 39 welded thereto, which is fashioned with a conical-shaped opening 40 therein. The lower sleeve 23 has a bracket 41 secured thereto, which is provided with a tapered pin 42.

When the wheel 18 is disposed in its load-carrying position, that is, the wheel is arranged in a vertical plane, the spring 24 will urge the tapered pin 42 into seating relation with the conical opening 40, thus holding the fork 27 and its wheel 18 from rotating about the axis of the shaft 22. The sleeves 21 and 23 have been shown as being slightly spaced from one another in Figure 6. Thus, when the opening 40 or the pin 42 wears, the spring 24 will still urge this pin against the wall of the opening 40, and thereby preclude the fork 27 from wobbling as the wheel is advanced over the ground.

I claim:

1. In a foldable produce-gathering vehicle: a supporting frame providing a pair of spaced-apart longitudinally-extending side members, which are interconnected at their forward ends by a transverse member; a swingable plate having tubes journalled on the transverse member of the frame, with said plate being movable from a position projecting forwardly and downwardly from the transverse member to a position projecting rearwardly therefrom; a wheel-mounting structure secured to said plate, and including a fork having a wheel journalled thereon; a tubular keeper secured to one of the sleeves; a bearing fixed to the transverse member, and being movable into alignment with the keeper, when the wheel-mounting structure is moved into a load-carrying position; and a retractible latch-bolt slidably carried by said bearing, and being movable into the keeper to releasably hold the wheel-mounting structure in its load-carrying position.

2. The foldable produce-gathering vehicle, as defined in claim 1; and in which the transverse member is provided with a stop pin, which is located to prevent the latching bolt from being entirely withdrawn from said bearing.

3. In a foldable produce-gathering vehicle: a supporting frame providing a pair of spaced-apart longitudinally-extending side members, which are interconnected at their forward ends by a transverse member; platforms secured to the side members for supporting a carton thereon; a swingable plate having tubes journalled on the transverse member of the frame; an upper sleeve fixed to the plate; a shaft anchored to the plate and extending downwardly through and below the upper sleeve; the upper sleeve having a washer-like element fixed thereto, which is fashioned with a conical-shaped opening; a lower sleeve mounted below the upper sleeve for rotation on the shaft, and having a tapered pin thereon, which is disposed to enter said opening when the lower sleeve is turned into a predetermined position relative to the upper sleeve; a spring yieldingly urging the lower sleeve toward the upper sleeve to thereby seat the pin in said opening; a fork fixed to the lower sleeve, and having a wheel journalled thereon; the plate being swingable into a position wherein the fork projects forwardly and downwardly from said transverse member, with the wheel resting on the ground; the plate being swingable to carry the fork and the wheel into a position wherein the wheel is disposed below the platforms; said lower sleeve being rotatable into a position wherein the wheel will be disposed substantially parallel with the side members of the frame, when said pin is withdrawn from said opening.

References Cited in the file of this patent

UNITED STATES PATENTS

| | | |
|---|---|---|
| 1,823,816 | Chittenden | Sept. 15, 1931 |
| 2,484,677 | Binz | Oct. 11, 1949 |
| 2,727,751 | Souris | Dec. 20, 1955 |

FOREIGN PATENTS

| | | |
|---|---|---|
| 621,153 | France | Jan. 29, 1927 |